United States Patent
Karpachevskyy

(10) Patent No.: US 10,226,823 B2
(45) Date of Patent: Mar. 12, 2019

(54) PORTABLE PIPE LATHE AND METHOD

(71) Applicant: FLEXPIPE SYSTEMS INC., Calgary (CA)

(72) Inventor: Taras Karpachevskyy, Calgary (CA)

(73) Assignee: SHAWCOR LTD. SHAWCOR LTÉE, Toronto (CA)

(*) Notice: Subject to any disclaimer, the term of this patent is extended or adjusted under 35 U.S.C. 154(b) by 0 days.

(21) Appl. No.: 14/725,645

(22) Filed: May 29, 2015

(65) Prior Publication Data

US 2016/0271702 A1    Sep. 22, 2016

Related U.S. Application Data

(60) Provisional application No. 62/136,321, filed on Mar. 20, 2015.

(51) Int. Cl.
| | | |
|---|---|---|
| *B23B 3/26* | (2006.01) | |
| *B23B 5/08* | (2006.01) | |
| *B23B 5/16* | (2006.01) | |

(52) U.S. Cl.
CPC ............ *B23B 3/26* (2013.01); *B23B 5/08* (2013.01); *B23B 5/16* (2013.01); *B23B 2215/72* (2013.01); *B23B 2226/27* (2013.01); *B23B 2226/61* (2013.01); *B23B 2260/03* (2013.01)

(58) Field of Classification Search
CPC .......... B23B 5/16; B23B 5/161; B23B 5/162; B23B 5/163; B23B 2215/72; B23B 2220/04; B23B 2220/08; B23B 2260/03
See application file for complete search history.

(56) References Cited

U.S. PATENT DOCUMENTS

| | | | | |
|---|---|---|---|---|
| 2,490,371 A | * | 12/1949 | Norton | ................ B23B 5/16 269/156 |
| 2,499,658 A | * | 3/1950 | Livingston | ............. B23B 5/163 408/101 |
| 3,927,584 A | * | 12/1975 | Mayfield | ................ B23B 5/162 82/113 |
| 4,104,937 A | * | 8/1978 | Breaux | .................. B08B 9/021 15/104.04 |
| 4,397,202 A | | 8/1983 | Mayfield et al. | |
| 4,437,366 A | | 3/1984 | Astle | |

(Continued)

FOREIGN PATENT DOCUMENTS

| | | | | |
|---|---|---|---|---|
| EP | 2644301 A1 | * | 10/2013 | ............. B23B 3/26 |
| GB | 557570 | | 11/1943 | |
| WO | WO 2015021492 A1 | * | 2/2015 | .......... B23B 41/006 |

*Primary Examiner* — Alan Snyder
(74) *Attorney, Agent, or Firm* — Bennett Jones LLP

(57) ABSTRACT

A pipe lathe includes a shaft; a cutting head supported on the shaft for movement with the shaft; a mandrel positionable on an outboard end of the shaft for supporting the shaft along a machining axis; and a first external pipe clamp and a second external pipe clamp, the first and the second external pipe clamps supported for external pipe engagement substantially concentrically about the machining axis. Multiple spaced apart engagement sites provided by the mandrel within the pipe and the external pipe clamps on an outer surface of the pipe support the pipe in a linear and centered position for machining by the cutting head, even when the pipe is non-linear, flexible and possibly with a cross section that is non-circular.

5 Claims, 10 Drawing Sheets

(56) References Cited

U.S. PATENT DOCUMENTS

| | | | | |
|---|---|---|---|---|
| 4,452,110 A | * | 6/1984 | Emmerson | B23B 5/162 |
| | | | | 408/130 |
| 4,483,223 A | * | 11/1984 | Nall | B23B 5/162 |
| | | | | 82/113 |
| 4,784,028 A | | 11/1988 | Standford | |
| 4,939,964 A | | 7/1990 | Ricci | |
| 4,954,023 A | | 9/1990 | Bromley | |
| 4,981,055 A | | 1/1991 | VanderPol et al. | |
| 5,054,342 A | | 10/1991 | Swiatowy et al. | |
| 5,775,188 A | | 7/1998 | Strait | |
| 6,189,425 B1 | | 2/2001 | Ricci et al. | |
| 6,536,316 B2 | | 3/2003 | Strait | |
| 6,637,304 B2 | | 10/2003 | Singer | |
| 2004/0187658 A1 | * | 9/2004 | Moruzzi | B23B 5/162 |
| | | | | 82/123 |

* cited by examiner

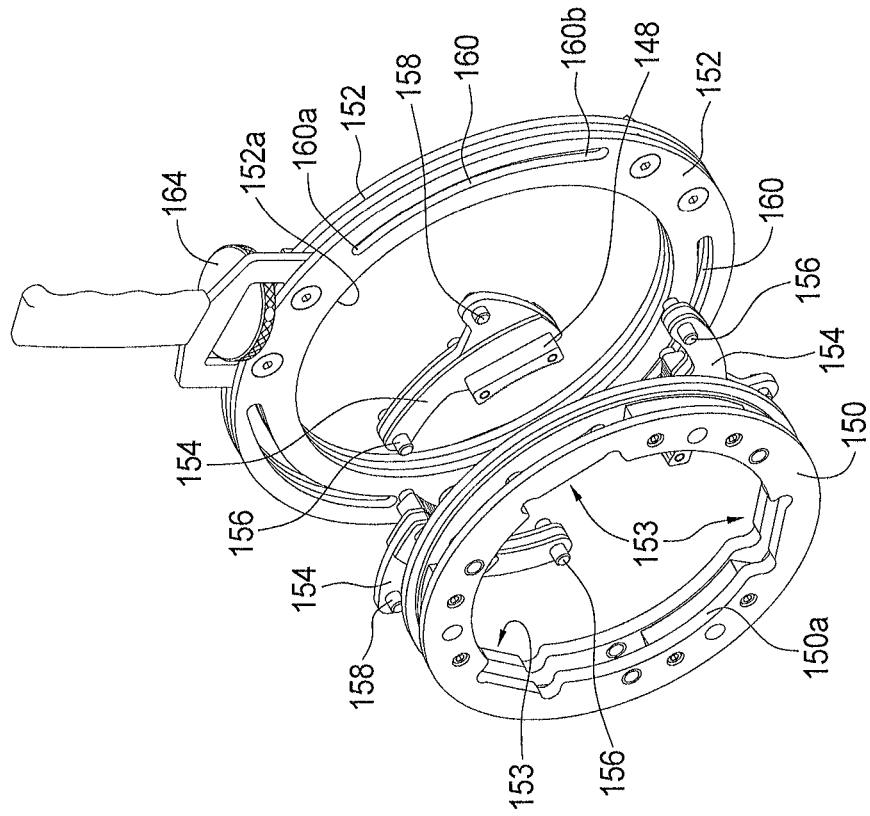
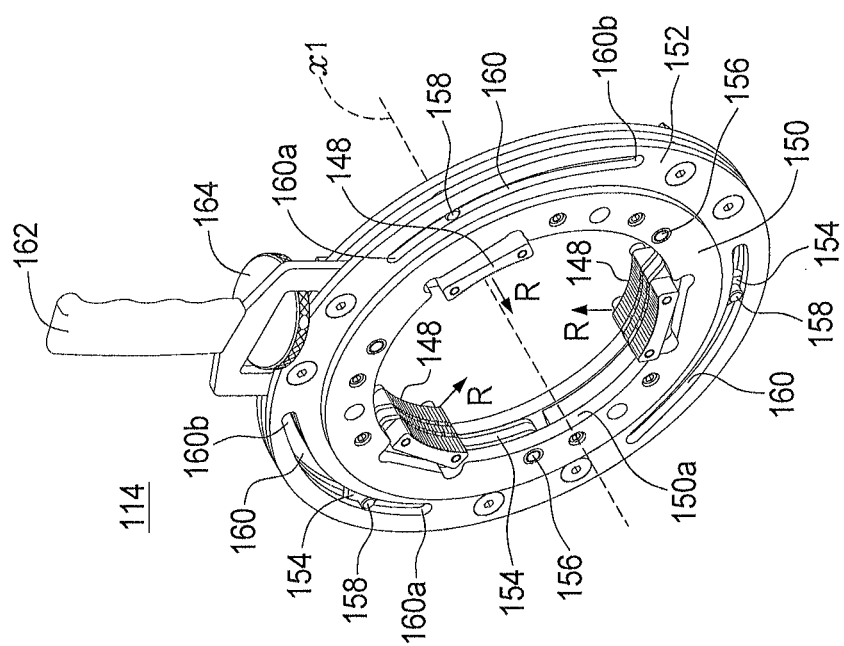

PORTABLE PIPE LATHE AND METHOD

FIELD

The present invention relates to a portable pipe lathe and a method for using it.

BACKGROUND

Portable pipe lathes are adapted to be mounted on or adjacent to a pipe to be machined, rather than requiring the pipe to be transported to a stationary tool. In pipeline applications, the machining of a pipe end must sometimes be accomplished in the field while the pipe remains partially connected into the pipeline, to prepare a pipe end during a repair or after the pipe is newly ended.

Portable pipe lathes are available, but are often intended for steel pipe. The machining of composite (i.e. plastic) pipes presents unique challenges due to relative flexibility of a composite pipe compared to stiffer metal pipe and the tendency for the composite pipe to be out of round.

SUMMARY

A pipe lathe has been invented for machining a pipe end. A method for using the pipe lathe has also been invented. The pipe lathe and method have particular, although not exclusive, advantage for composite pipes.

In accordance with one aspect of the present invention, there is provided a pipe lathe for machining a pipe comprising: a shaft; a cutting head supported on the shaft for movement with the shaft; a mandrel positionable on an outboard end of the shaft for supporting the shaft along a machining axis; and a first external pipe clamp and a second external pipe clamp, the first and the second external pipe clamps supported for external pipe engagement substantially concentrically about the machining axis.

In accordance with another broad aspect of the present invention, there is provided a method for machining an end of a pipe, the pipe having an inner wall surface and an outer wall surface, the method comprising: engaging the pipe to be machined with a lathe at a plurality of axially spaced apart engagement sites along a long axis of the pipe, at least one of the engagement sites being an inner engagement site against the inner wall surface and at least one of the engagement sites being an outer engagement site against the outer wall surface; and machining an end of the pipe with a cutting head supported by the plurality of axially spaced apart engagement sites to move through a substantially concentric path relative to the long axis.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 5A is a perspective view of an external pipe clamp useful in the present invention.

FIG. 5B is an exploded, perspective view of the external pipe clamp of FIG. 5A.

DETAILED DESCRIPTION OF THE INVENTION

Figure 1:
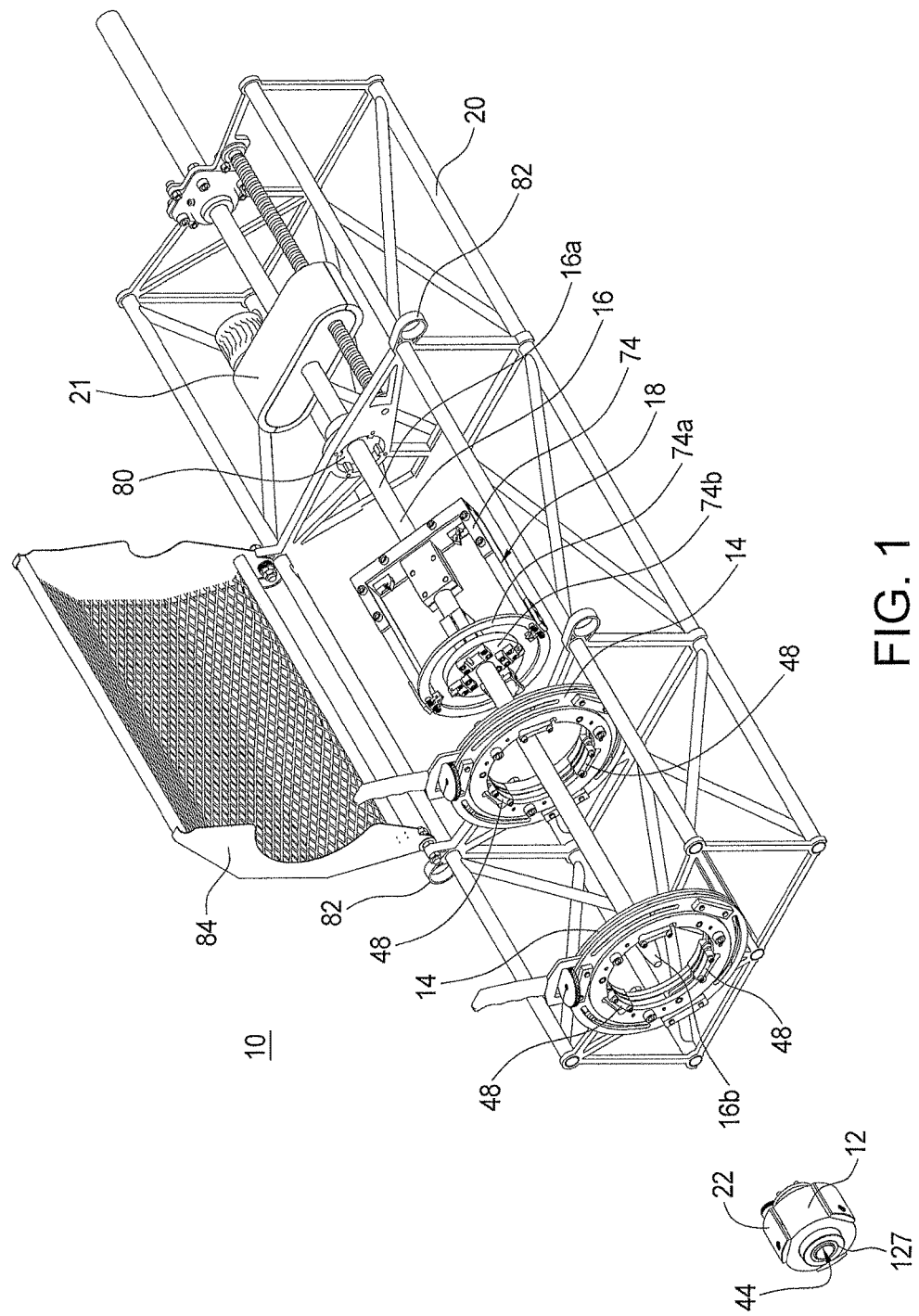
FIG. 1 is a perspective view of an embodiment of a pipe lathe.

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

Figure 2A:
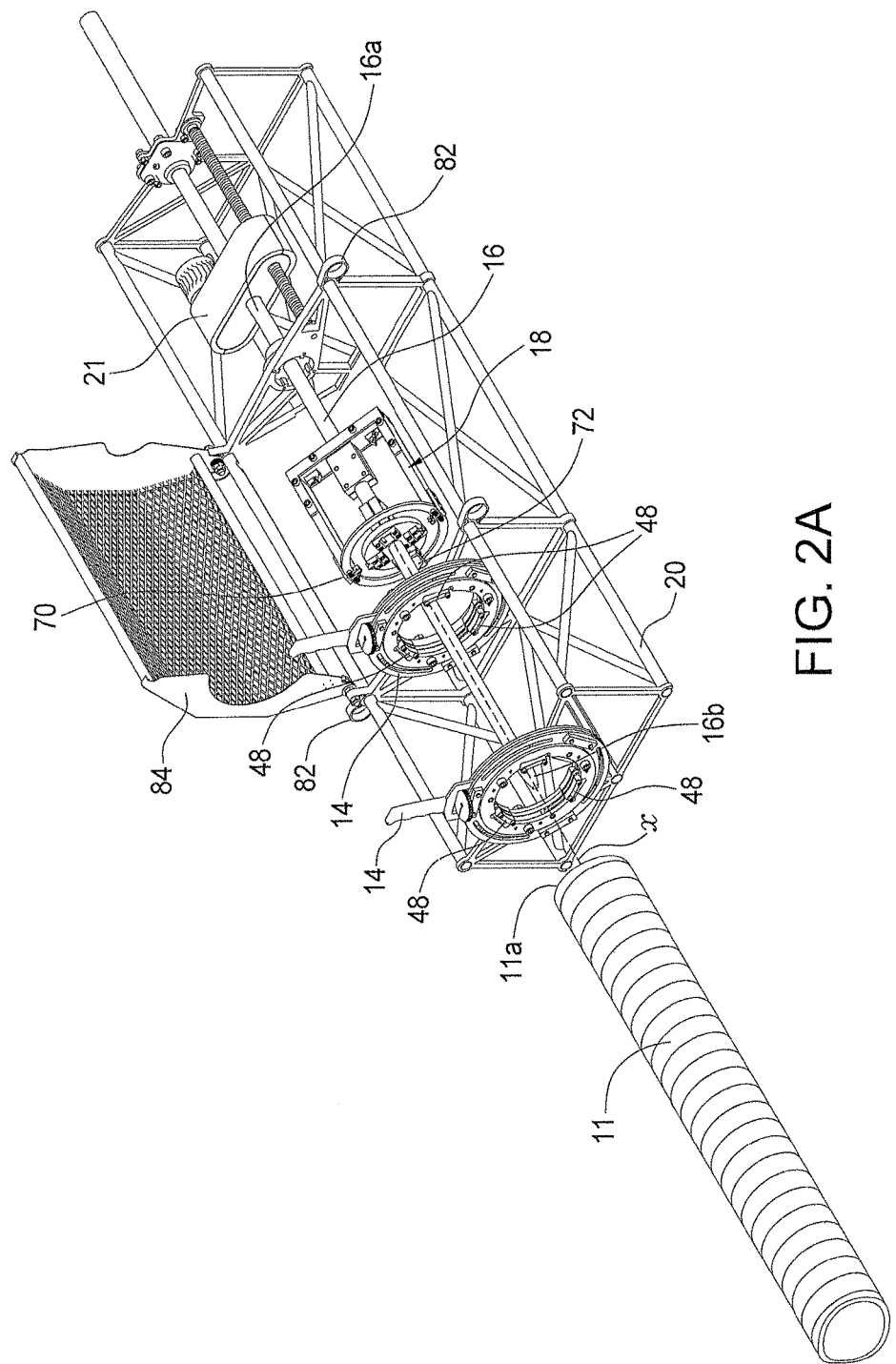
FIG. 2A is a perspective view of the pipe lathe of FIG. 1 with a pipe aligned for insertion into the pipe lathe.
Figure 2B:
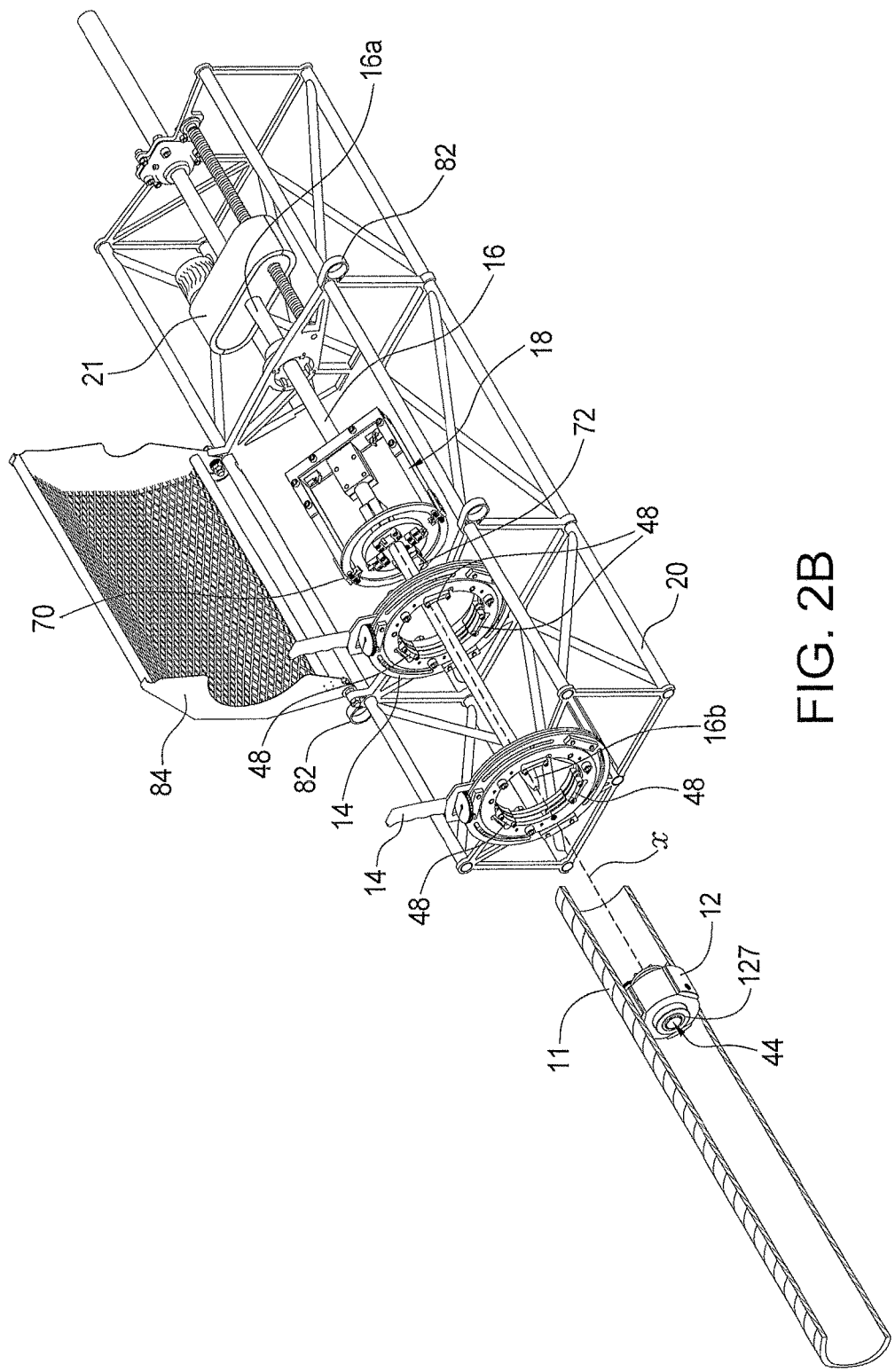
FIG. 2B is a perspective view of the pipe lathe of FIG. 2A with a portion of the pipe cut away.
Figure 3A:
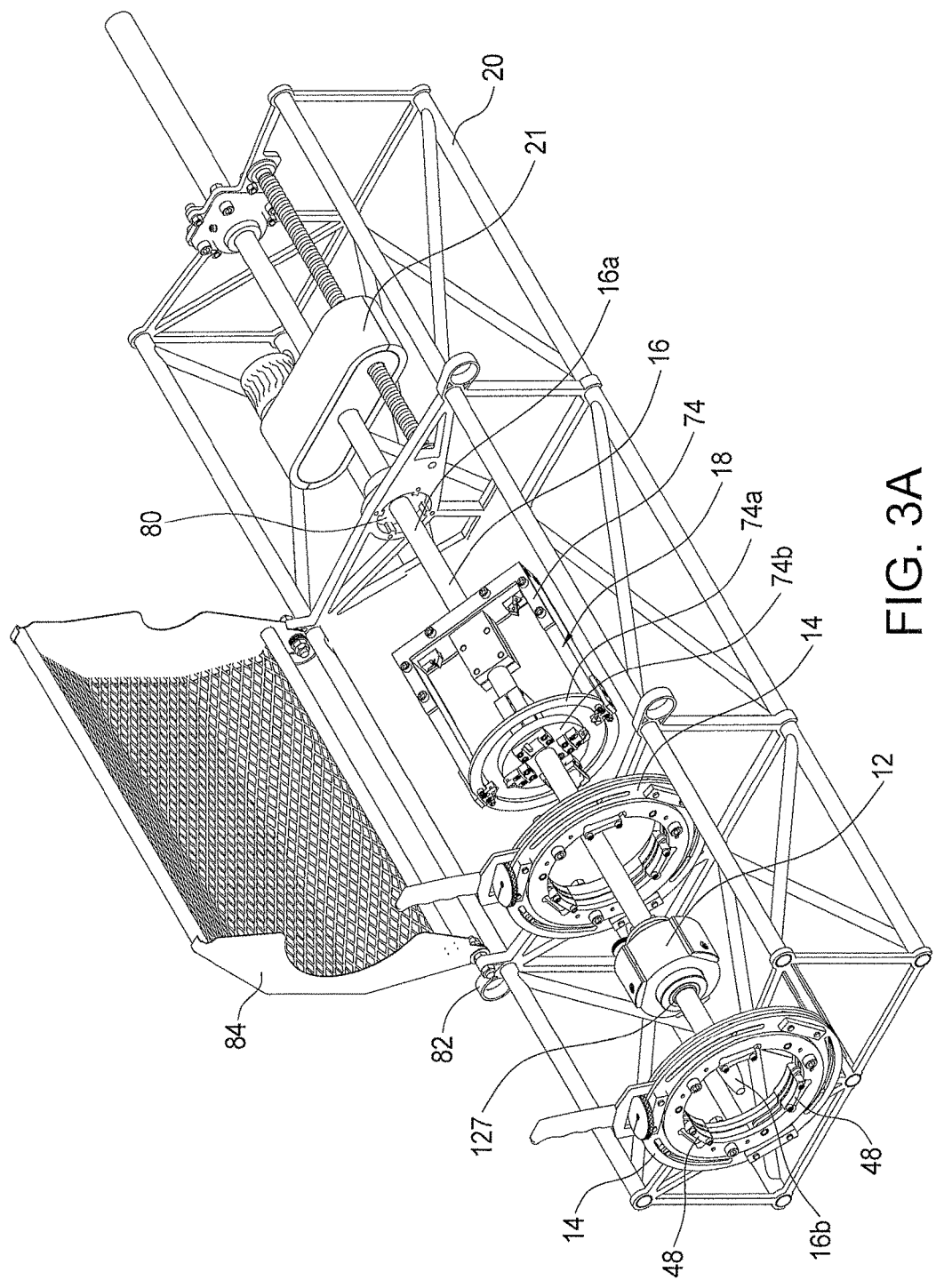
FIG. 3A is a perspective view of the pipe lathe of FIG. 1 with a mandrel installed in the working position.
Figure 3B:
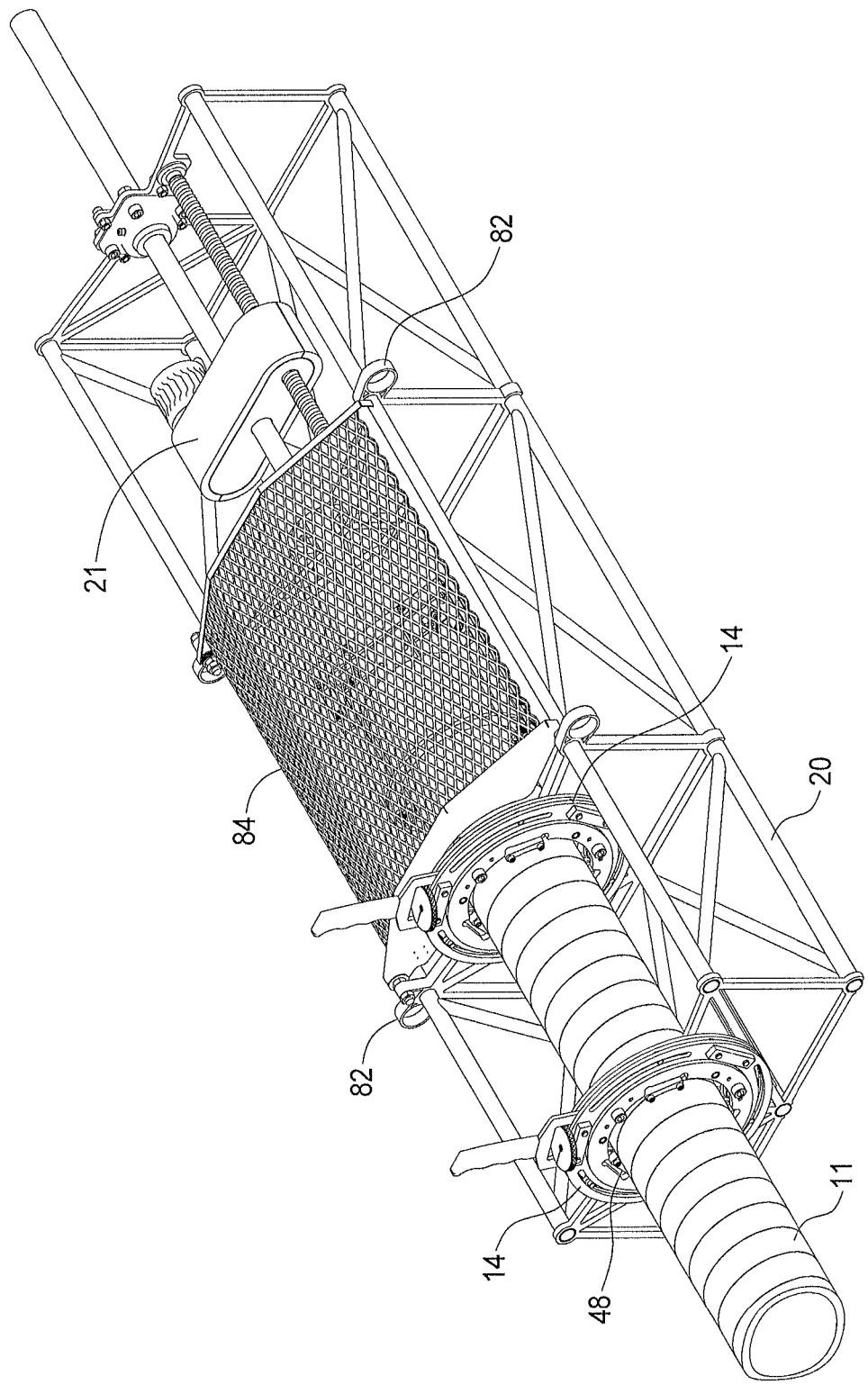
FIG. 3B is a view corresponding to FIG. 3A with a pipe installed on the mandrel.
Figure 3C:
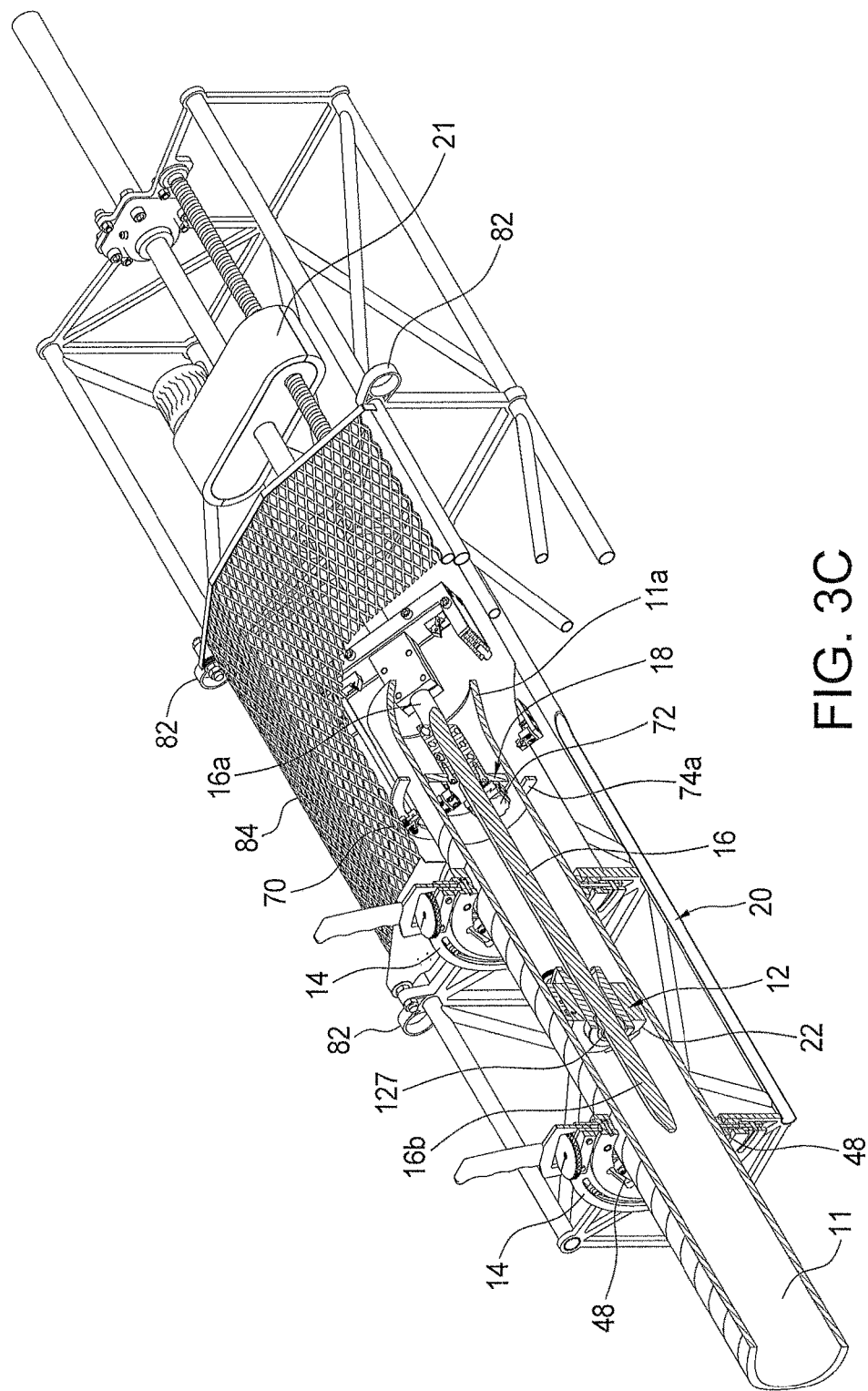
FIG. 3C is a view corresponding to FIG. 3B with a pipe installed in the pipe lathe and portions of the lathe and the pipe cut away.

A pipe lathe 10 is shown in the Figures and the illustrated pipe lathe can be employed to machine the end of a pipe 11. A method for machining the end of a pipe will be described as well by reference to FIGS. 2 to 3B.

The pipe lathe includes a mandrel 12, an external pipe clamp 14, a shaft 16, a cutting tool 18 and a frame 20.

The pipe lathe operates about a machining axis x. Shaft 16 supports mandrel 12 which supports and centralizes within pipe 11 to be machined and shaft 16 also carries and inputs drive energy into cutting tool 18. The shaft's long axis extends along the machining axis and ensures that the center point of the annular movement of cutting tool 18 is substantially aligned with machining axis x.

External pipe clamp 14 engages the outside surface of pipe 11 to be machined and holds it substantially concentric and parallel to the machining axis.

Thus, clamps 14 and mandrel 12, in cooperation with frame 20, hold the shaft's outboard end 16b for aligning the shaft axially with the machining axis and maintaining the shaft's rigidity and hold the pipe's axis substantially parallel and concentric with shaft 16 and, thereby, machining axis 16. Thereby, the cutting tool, which is carried on the shaft, is likewise supported to pass through an annular path substantially concentric with the long axis of the pipe. In this manner, any pipe installed in the lathe can be treated substantially uniformly about its exposed inner and/or outer circumference in spite of the pipe possibly being flexible, non-linear and/or non-circular.

Shaft 16 is secured at one end 16a in frame 20 and outboard end 16b is free to be inserted into and secured by mandrel 12 inside a pipe to be machined. Shaft 16, along with cutting tool 18, can be rotated about and/or moved along its long axis x by any of various means such as a drive mechanism 21. Clamps 14 position and secure the pipe with mandrel 12 concentrically within the pipe and shaft 16 is generally held stationary in frame 20 and mandrel 12 against lateral movement. As such, the combination of frame, mandrel and clamps hold the shaft aligned, and the pipe substantially concentric, with machining axis x.

Mandrel 12 includes a main body and an outer surface 22. The main body is sized to be positioned and firmly secured within a pipe to be machined. The outer surface of the mandrel, when in operable position engages the inner wall of the pipe to be treated. By engaging the inner wall at a plurality of positions about the inner circumference, the mandrel may be held concentrically within the pipe.

While mandrel 12 may be of a construction to be forced into a pipe inner diameter and to become firmly secured therein, in one embodiment mandrel 12 may be expandable such that it is readily insertable into a pipe and then can be expanded to securely engage the inner wall of the pipe.

Figure 4A:
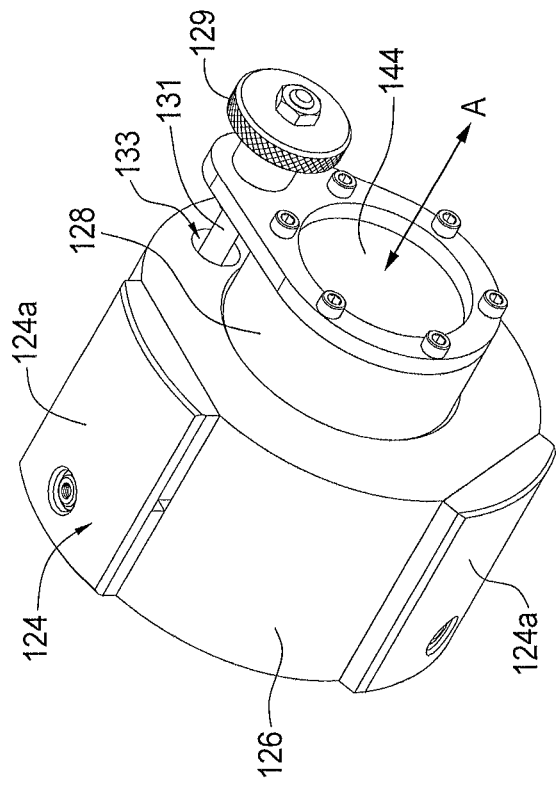
FIG. 4A is a perspective view of a mandrel useful in the present invention.
Figure 4C:
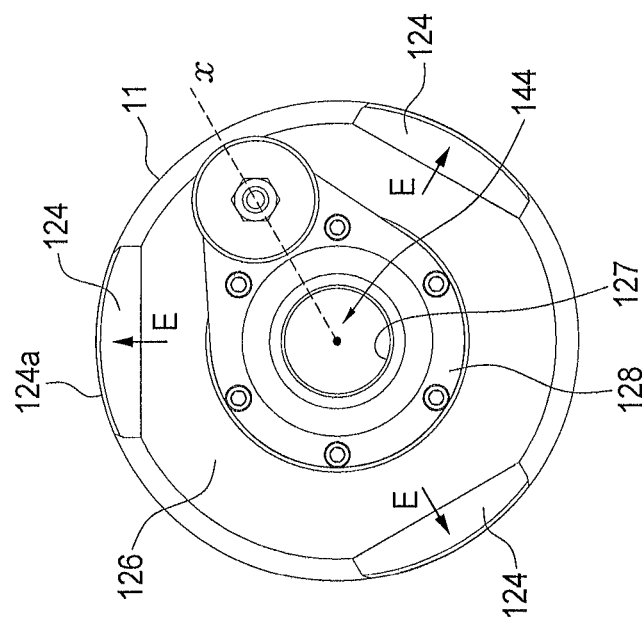
FIG. 4C is a schematic view of a section through a pipe with the mandrel of FIG. 4A installed therein.
Figure 4B:
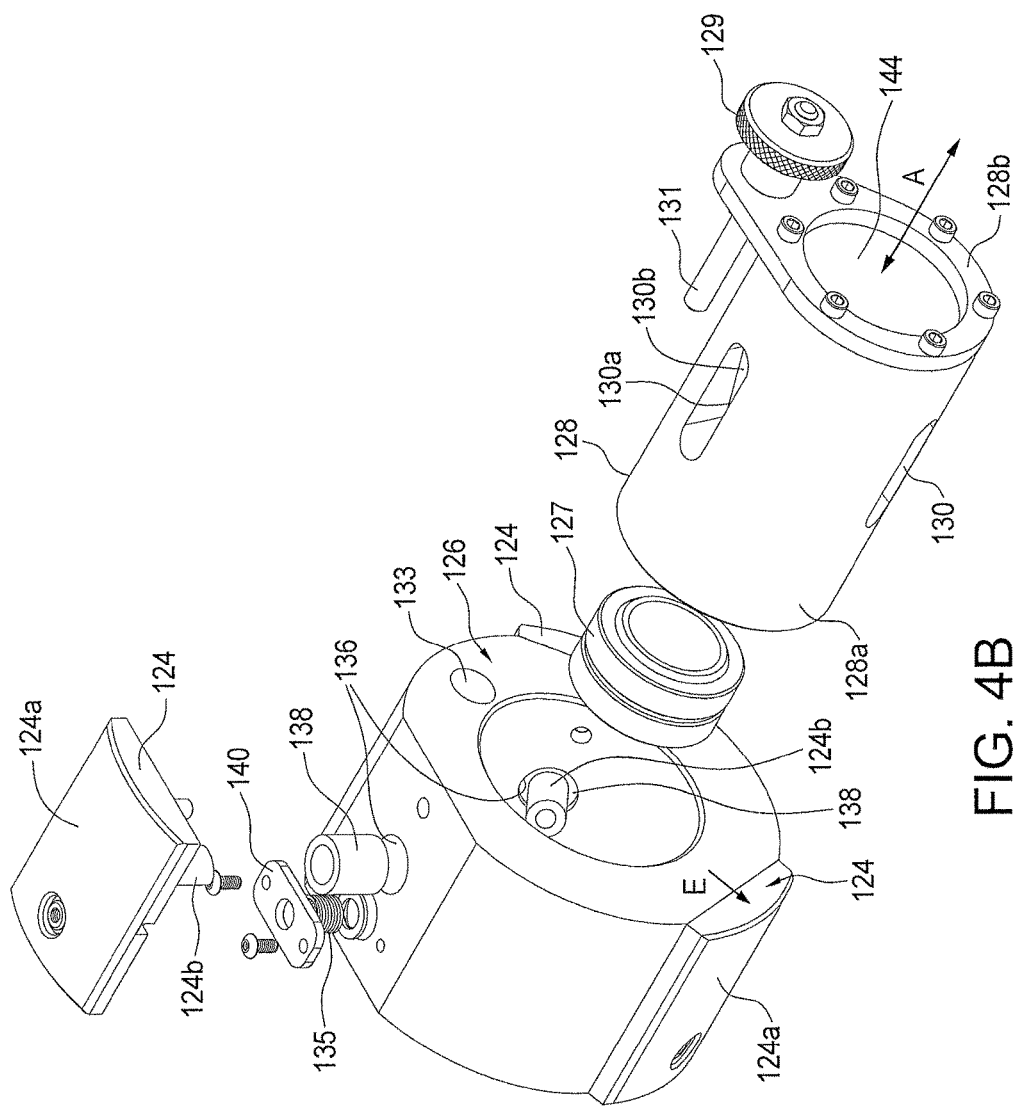
FIG. 4B is an exploded, perspective view of the mandrel of FIG. 4A.

In one embodiment shown in FIGS. 4A to 4C, an expandable mandrel 112 may include, for example, a plurality of pads 124 that are radially expandable and contractable relative to a main body 126. Pads 124 are equally spaced apart about the outer circumference of the main body to provide contact surfaces for engaging within the pipe. In one embodiment, there are three or more pads such that a substantially concentric installation can be more readily achieved with the main body supported on the pads 124. Three spaced apart pads, for example, may be particularly useful to achieve centering while minimizing complexity. Each pad has an exposed outer facing surface 124a through which the pad engages the inner wall.

An expansion mechanism permits expansion of pads 124, for example along arrows E, when desired. In this embodiment, the expansion mechanism includes an inner sleeve 128 positionable centrally between the plurality of pads. Inner sleeve 128 includes one or more ramped surfaces 130 that can be moved axially behind the pads 124 to bear against the back sides 124b of the pads and push the pads out. The ramped surfaces 130 are preferably recessed flat surfaces that taper axially from a smaller depth 130b to a larger depth 130a. The larger depth 130a along the ramped surface is a position where the pads can retract and the smaller depth 130b along the ramped surface is where the pads are pushed out. The ramped surfaces 130 may be, for example, machined into sleeve 128 at an angle relative to the long axis of the sleeve.

The pads can be expanded and retracted by moving the ramped surfaces 130 of inner sleeve 128 axially behind the pads such that the backside 124b of the pads are acted upon by the ramped surfaces. In this embodiment, inner sleeve 128 resides in a central opening 126a of body 126 and the backsides 124b of pads 124 protrude through the body into opening and therein can be contacted by sleeve 128. The sleeve has a knob 129 attached to a shaft 131 which is received in a hole 133 of body 126. Knob 129 is for turning shaft 131 about its central long axis. Shaft 131 is threadedly connected to the inner surface of hole 133 such that by turning shaft 131, sleeve 128 slides axially relative to body 126. Of course, other expansion mechanisms are possible including hydraulics, pneumatics, etc.

In the illustrated embodiment, the backside surface 124b of each pad that is in contact with sleeve 128 is a protrusion such as a pin secured to the pad that extends though a port 136 in body 126 into contact with inner sleeve 128. A bushing 138 may be positioned between the protrusion and the port 132 to facilitate expanding/retracting movement of the pads relative to the body. While one of the protrusions is already inserted into the opening 126a in FIG. 4B, it is to be understood that the protrusion is retracted to permit sleeve 128 to be installed. During installation of sleeve 128, a ramped surface 130 is aligned under port 136 and then the pad's protrusion is pushed through the port 136 and against the aligned ramped surface 130.

Pads 124 may be biased inwardly, if desired, to ensure that they remain retracted until urged out. For example, in one embodiment, springs 135 can be retained by retainers 140 at the backside surface 124b of the pads.

Mandrel 12 also includes a central connection point for supporting shaft 16. The mandrel and the connection point ensure that when the mandrel is positioned concentrically in a pipe 11 to be machined by the self-centering operation of the pads, shaft 16 can be supported concentrically at the connection point to also be held concentrically in the pipe. The mandrel can be permanently or removably connected to shaft 16. In the illustrated embodiment of FIGS. 1 to 3B, mandrel 12 removably accepts shaft 16 into a central bore 44 in its body. Mandrel 12 is installed first in pipe in an orientation that positions central bore 44 concentrically within the pipe and is close enough to the end of pipe to be reached by shaft 16. Then shaft 16 is inserted into the pipe and into the central bore 44.

With reference to the embodiment of FIGS. 4A to 4C, inner sleeve 128 has a proximal end 128b and a distal end 128a, and a central bore 144 is formed in inner sleeve 128 into which a shaft can be inserted (along arrow A) for support. Proximal end 128b is the end at which the shaft is first received when the shaft is inserted into central bore 144. Central bore 144 may act as a bearing surface to accommodate linear and/or rotational movement of the shaft therein, while the mandrel remains stationary. There may be a close fit between the bore and shaft such that the center of shaft is positioned generally at the center point of central bore 144.

Alternatively, a bearing 127 is provided in bore 144 at or near distal end 128a. Bearing 127 is for engaging the shaft to accommodate linear and/or rotational movement of the shaft therein. Alternatively or additionally, bore 144 or a portion thereof may have a funnel-like inner surface, with the larger inner diameter end at or near proximal end 128b, and the smaller inner diameter end at or near distal end 128a. As the shaft is inserted into bore 144, the funnel-like shape inner surface helps guide the outboard end 16b of the shaft to distal end 128a and/or bearing 127, if included. Further, outboard end 16b may have a tapered tip for facilitating insertion into and through bore 144.

While mandrel 12 is secured within a pipe, external pipe clamps 14 secure the pipe and hold it in a linear fashion and substantially concentrically about shaft 16, which carries cutting head 18. The arrangement of the mandrel and the external pipe clamp may hold the pipe on both the inside and the outside at at least three sites that are axially spaced apart along the axis x. In particular, there may be at least two sites of engagement on one side of the pipe (inside or outside) and at least one site of engagement on the opposite side (inside or outside). The at least two sites of engagement on one side of the pipe wall may straddle a site of engagement on the other side of the pipe wall. In one embodiment, the pipe is engaged at two sites externally and at one site internally. The internal engagement is through mandrel 12. The external engagement helps ensure that the long central axis of the pipe is concentric and parallel to the long axis of the frame. The internal engagement helps align the outboard end of the shaft with the central long axis of the pipe, and secure the outboard end of the shaft relative to the pipe to assist in preventing tooling deflection and chatter.

While there may be one elongate external pipe clamp that engages the pipe at the at least two axially spaced apart sites, in the illustrated embodiment, there are two separate external pipe clamps 14. The illustrated lathe is attached to the pipe using the pair of separated clamps 14 and the expanding mandrel on the inside, which allows the pipe to be centered on and parallel to the machining axis of the lathe, which is the axis along which the shaft extends.

Clamps 14 are mounted in frame 20 in an orientation to accept pipe 11 inserted through them with both of the clamps engaging the outer surface of the pipe in an axially spaced apart orientation.

External pipe clamps can take various forms to ensure the pipes are held firmly but without significant surface damage and substantially concentrically relative to the frame, and thereby the shaft and cutting head 18. For example, to be useful with composite pipe, which may be non-linear and out of round, the pipe clamps may be self-centering. In particular, the pipe clamps may have engagement pads 48 that can be moved inwardly towards a center axis through which the shaft 16 passes. There may be at least three circumferentially spaced pads in each clamp.

With reference as well to FIGS. 5A and 5B, a self-centering clamp 114 is illustrated that may be useful with the present pipe lathe. Clamp 114 includes at least three engagement pads 148 that each move inwardly along a substantially radial direction, arrows R, towards a center axis x1. Clamps 114 can be mounted in the lathe such that axis x1 becomes coaxial with the long central machining axis x of the lathe, along which the center axis of both the shaft and a pipe to be worked are intended to pass. Pads 148 are configured to move radially inwardly and to reverse radially outwardly by rotation of a mounting ring 152 relative to a main body 150 that is secured in a stationary position in frame 20.

Mounting ring 152 includes a central opening 152a and main body 150 is secured in the central opening 152a. Main body 150 also includes a central opening 150a substantially centered on axis x1. Pads 148 are exposed in opening 150a and are moveable towards and away from axis x1. A pipe to be clamped can be positioned to pass through opening 150a to be engaged by pads 148.

Mounting ring 152 is rotatable in-plane about the main body. In other words, mounting ring 152 can rotate about center axis x1 while main body 150 remains stationary and coaxial with axis x1.

Pads 148 are mounted on cams 154 that are each secured at a fulcrum 156 to main body 150 and each, as well, secured through a sliding guide pin 158 into a spiral slot 160 on the mounting ring. Spiral slot 160 is a slot in which a guide pin can be secured. Slot 160 extends through mounting ring and is an arc about axis x1, but spirals outwardly away from axis x1 such that the slot is closer to axis x1 on one end 160a and further away from axis x1 on the other end 160b.

When the main body 150 is properly assembled in central opening 152a, such that mounting ring 152 can rotate about the main body, and cams 154 are installed with each guide pin 158 slidably rideable in a spiral slot 160 and fulcrums 156 attached to main body 150, relative rotation of mounting ring 152 to main body 150, the guide pins 158 are caused to move in their slots 160 closer or further away from axis x1, depending on which end 160a, 16b of the slot the guide pin is moved towards. Considering that cams 154 are each connected to main body 150 through fulcrums 156, this movement of guide pins 158 in and/or out drives cams 154 and, therefore, pads 148 in a radial direction inwards or outwards depending on the direction of rotation of mounting ring 152.

Handle 162 is connected to mounting ring 152 to permit rotation thereof relative to main body 150. In other words, pads 148 are moved radially inwardly or outwardly simply by moving handle 162 angularly relative to main body 150. A lock mechanism allows the position of mounting ring 152 to be locked. In this illustrated embodiment, lock mechanism is a threaded lock actuated by knob 164.

Because pads 148 are moved the same distance whenever mounting ring is rotated, the pads are self-centering. The clamps ensure the pipe is substantially centered, regardless of the pipe outer diameter and variations of same along the length of the pipe. Clamps 114 also ensure that pads come in substantially along a radial direction such that the pipe tends not to be twisted or scored.

Notches 153 may be formed in the opening of main body 150 to provide a space in which pads 148 are received when pads 148 are retracted radially inwards, thereby minimizing any interference by the pads with a pipe that is being inserted through the opening of main body 150.

Clamps 114 may be adapted to allow the position and/or direction of the pipe through the lathe to be fine tuned, which allows for concentric alignment and cutting of pipe that is not completely straight. For example, one or more of clamps 114 may be configured to allow adjustment of the clamping position of same relative to the frame, in the plane substantially perpendicular to the machining axis. This may be achieved by using shims under one or more pads 148 to bias the clamped pipe slightly in a particular direction. Alternatively or additionally, the frame section on which the clamp is mounted may include a plurality of vertical and horizontal holes and the clamp is mounted to the frame at at least one vertical hole and one horizontal hole by fasteners. In this manner, the vertical and/or horizontal position of the clamp relative to the machining axis can be varied depending on which holes the clamp is mounted on. Alternately, the clamps can be mounted on slots or slides and their positions can be adjusted using screws or similar.

Figure 6B:
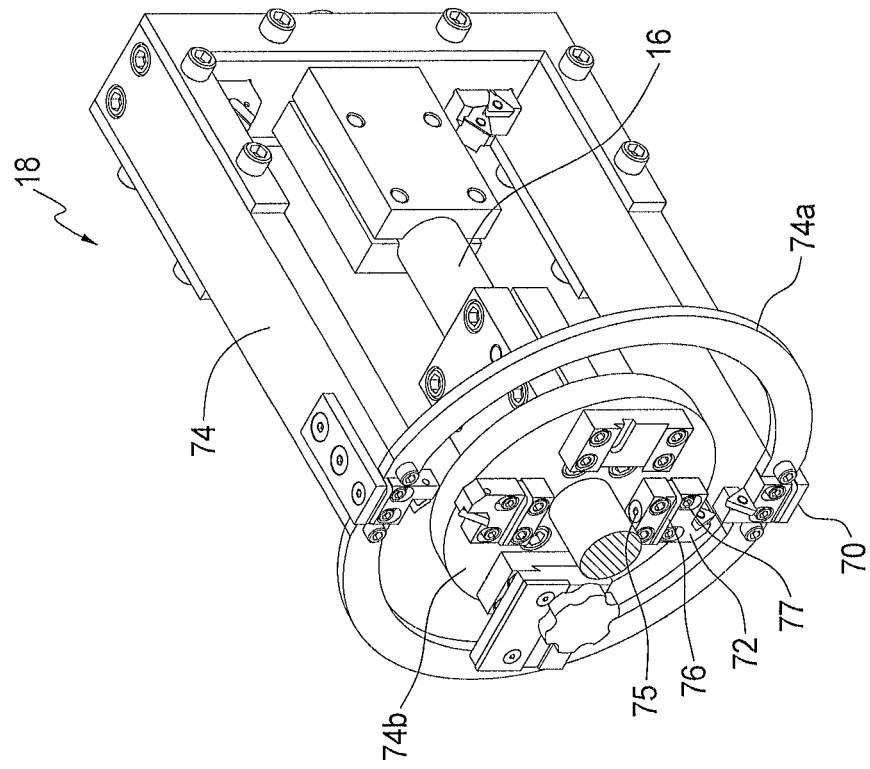
FIG. 6B is a perspective view of the cutter head of FIG. 6A.
Figure 6A:
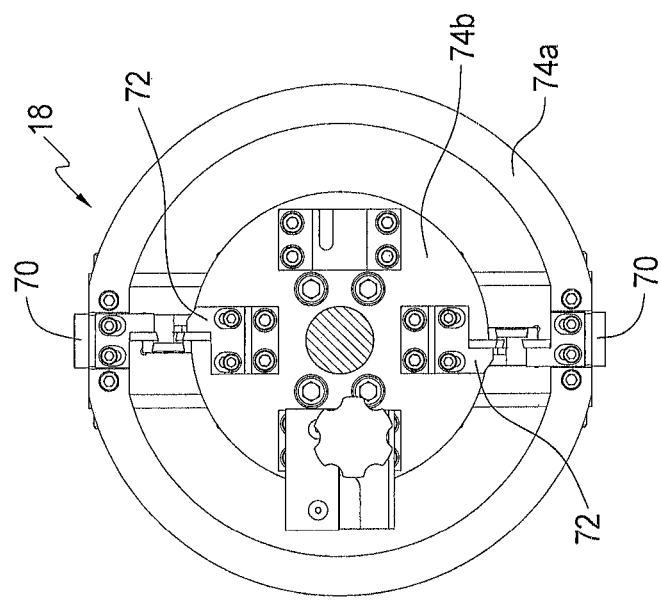
FIG. 6A is an end view of a cutter head useful in the present invention.

With respect to FIGS. 6A and 6B, cutting head 18 can take various forms, depending on how the pipe end is to be machined. Cutting head 18 can include tools such as cutters 70, 72 (based on mechanical cutting, abrading, lasers, etc.) for machining the interior and/or exterior surfaces of the pipe end. For instance, cutters 70, 72 may be cutter inserts such as of carbide. Cutter head 18 can include a structure 74 for carrying and positioning the cutters relative to shaft 16, and thereby a pipe. For example if the cutting head is intended to machine the outer surface of a pipe, structure 74 can include an outer diameter ring 74a larger than the pipe outer diameter to be machined and/or an inside structure 74b smaller than the pipe inner diameter that can fit within the pipe. An annulus is defined between outer diameter ring 74a and inside structure 74b for receiving a pipe end therethrough. While structure 74 may translate rotational and/or axial drive from shaft 16 to cutters 70, 72, structure 74 may also include extensions and/or drives for driving further axial or rotational movement of cutters 70, 72.

Cutting head 18 is spaced from external pipe clamps 14 and mandrel 12 such that, while being firmly clamped, end 11a of pipe has a length exposed so that both inside and outside surfaces can be machined without readjustment of the clamps 14 and mandrel 12. If desired, the inside and outside surfaces can be machined simultaneously.

Cutting head 18 is supported by a plurality of axially spaced apart engagement sites between the lathe and the pipe to move through a substantially concentric path relative to the long axis of shaft 16 which is the machining axis of the lathe. In particular, cutting head 18 is attached to shaft 16 which effectively is secured on both ends: to mandrel 12 and therethrough to pipe 11 on one end; and to the frame on the other. Through the frame and clamps 14, shaft 16 is connected to the outside of the pipe. As such, this allows for a stiff connection between the pipe and the cutting head, which is useful as the lathe is free of connection to the opposite end of the pipe.

A knob on inside structure 74b may be used to secure a removable end-facing blade to structure 74.

The distance between cutters 70, 72 can be adjusted for pipes of different thicknesses. Adjustment may be by loosening screws 75, 77 and sliding the cutters along adjustment slots. Their position can be adjusted within a small range by adding or removing shims 76. Screw 75 compresses the shim stack to permit repeatable positioning.

The cutting head is fixed to the shaft such that the axial position of the cutting head can be varied by moving the shaft axially relative to the frame. If a pipe is installed in the lathe, the cutting and/or machining position of the cutting head on the pipe can thus be adjusted by moving the shaft axially.

Frame 20 supports clamps 14 and shaft 16 to ensure that they remain positionally fixed. Frame 20 also includes a bearing 80 for supporting the linear and/or rotary motion of shaft 16. Frame 20 may also support the drive mechanism 21.

Frame 20 is portable. In one embodiment, frame 20 includes lugs 82 (i.e. also called eyes) that permit connection to a lifting harness. In a further embodiment, the truss structure of the frame, for example as shown in the figures, helps minimize the weight of the lathe while providing sufficient structural stiffness for the machining operation.

For safety, a safety shield 84 may be secured over the frame adjacent the area where the cutting head will operate.

Drive mechanism 21 can take various forms. The selected mechanism may depend on the way in which shaft is to be driven for operation of the lathe. In one embodiment, the drive mechanism drives the shaft axially and rotationally. However, axial movement and rotation of the shaft do not have to be carried out simultaneously nor carried out by the same component of the drive mechanism. The drive mechanism may be, for example, electrical, hydraulic, pneumatic, etc., or a combination thereof. For instance, the shaft may be driven axially by a screw, rack, belt, linear actuator, hydraulic piston, etc., or a combination thereof.

In a sample embodiment, the drive mechanism may include a motor for driving the shaft rotationally and a separate motor for driving the shaft axially. The motors may be preprogrammed and/or user-controlled via a user interface.

In the illustrated embodiment, a main motor rotates shaft 16 and an internal secondary motor linearly actuates the drive unit and attached shaft along a stationary screw.

The drive mechanism may include a travel limiter for automatically stopping any movement of the shaft when the cutting head reaches a preselected position relative to the frame and/or the pipe end. The drive mechanism may be in communication with sensors for detecting the position of the cutting head relative to the frame and/or the pipe end, thereby allowing the drive mechanism to monitor and stop any shaft movement as desired (e.g. when the cutting head has reach the end of the section of the pipe end to be machined).

The machined surface finish of the pipe end may be customized by coupling the axial motion of the shaft to the rotation of same, mechanically or electronically, to advance the cutting head carried on the shaft along a helical path on the pipe end.

In a further embodiment, the cutting head is movable axially relative to the shaft by a second drive mechanism. In this embodiment, the shaft may be stationary or also moveable axially relative to the frame.

In operation, a pipe is installed in the lathe for machining the pipe end 11a. Pipe 11 may not be perfectly circular in cross section and may not be perfectly linear, which properties may interfere with a good machining operation. Plastic, such as composite pipes are especially prone to geometric defects. As such, lathe 10 may adjust for these deficiencies in the pipe by seeking to hold the pipe at a plurality of axially spaced apart locations, relative to the long axis of the pipe, and with clamping engagement between the lathe and both the inner and the outer walls of the pipe to be machined. Also, exterior clamping engagement may include such clamping at a plurality of circumferentially spaced apart locations.

In addition, the cutting head may be held stable both by support through interior clamping and exterior clamping.

In one embodiment, the method includes inserting a mandrel 12 into the inner diameter of the pipe to be machined and positioning the mandrel in engagement with the inner diameter such that the mandrel is positionally fixed with a center point of the mandrel substantially coincident with a center axis x of the pipe. The mandrel can be inserted while it already is engaging the inner wall of the pipe or may be inserted and then expanded into engagement with the inner wall. The method may include expanding pads radially outwardly from a main body of the mandrel to install the mandrel into engagement with the inner wall of the pipe.

The mandrel 12 acts as a support for a drive shaft 16 of the lathe. As such, the method includes supporting the shaft in the mandrel. For example, the shaft is supported through engagement with the center point of the mandrel. In one embodiment, the shaft is already installed in the center point of the mandrel when the mandrel is installed in the pipe and in an alternate embodiment, the mandrel is installed first and then the shaft is installed in engagement with the mandrel's center point. In one embodiment, the shaft's outboard end is inserted through a port in mandrel's center point. The shaft may be supported for rotation and/or linear movement through the mandrel while the mandrel is stably positioned in the pipe against axial and/or lateral movement.

The method also includes clamping the pipe's exterior surface in addition to the interior clamping such that there are both interior and exterior sites of engagement between the lathe and the pipe. In one embodiment, there are at least three sites of engagement between the lathe and the pipe including both interior and exterior sites of engagement and these three sites are axially spaced apart. In one embodiment, the pipe is clamped on its exterior surface at two spaced apart exterior sites of engagement and is clamped with engagement against its interior surface at at least one interior site of engagement (via the mandrel), which is axially positioned between the two spaced apart exterior sites of engagement (via exterior clamps). In other words, the clamps clamp the pipe at sites straddling the site of engagement of the mandrel with the interior pipe wall.

The sites of engagement may each include a plurality of, such as at least three, spaced points of engagement around the circumference of the pipe at the site of engagement. For example, each site of engagement may include three or more pads that can be positioned in engagement with the pipe. The pipe may be clamped into a substantially concentric position about the shaft and thereby the cutters carried on the shaft.

In one method, engaging an exterior wall of the pipe includes clamping an external clamp about the outer surface of the pipe. The clamping process may include driving a plurality of, for example at least three, pads inwardly to engage the pipe external surface at three circumferentially substantially evenly spaced apart locations. Driving may include centering the pads on the center axis relative to the shaft.

Thereafter, the end of the pipe may be machined. For example, the method may then include bringing the cutting head into engagement with the pipe end to machine it and/or driving the cutting head to machine the pipe end.

Since the pipe lathe is portable, the method may be conducted in the field while the pipe remains connected into a pipeline during original installation or repair. Machining may occur on one end of a pipe while the other end of the pipe is free of connection to the lathe. The other end of the pipe may be supported on the ground, or another structure apart from the lathe. In one embodiment, the other end of the pipe may be supported by connection to a pipeline. The method may include transporting the lathe to a field location for use.

It will be apparent that many other changes may be made to the illustrative embodiments, while falling within the scope of the invention and it is intended that all such changes be covered by the claims appended hereto.

I claim:

1. A method for machining an end of a pipe, the pipe having a center axis, an inner wall surface and an outer wall surface, the method comprising:
   engaging the pipe to be machined with a lathe, wherein engaging includes:
   a. installing a self-centering mandrel within the pipe and driving an expansion device to expand together at least three pads into engagement with the inner wall surface to form an inner engagement site that is positionally fixed with a central bore of the mandrel substantially co-axial with the center axis of the pipe; and
   b. securing a first external self-centering clamp against the outer wall surface at a position axially spaced from the inner engagement site and securing a second external self-centering clamp against the outer wall surface at a second position axially spaced from the inner engagement site and on an opposite side of the mandrel from the first external self-centering clamp, such that the first external self-centering clamp and the second external self-centering clamp straddle the self-centering mandrel;
   c. installing a first end of a drive shaft through a center point the central bore of the mandrel while a second end of the drive shaft is secured at a mounting site coupled concentrically to both the first external self-centering clamp and the second external self-centering clamp such that the drive shaft is positioned substantially co-axially with the center axis of the pipe and supported at both the first end and the second end; and
   machining the end of the pipe with a cutting head supported by the drive shaft, including driving the drive shaft to rotate within the central bore of the mandrel, thereby, to move the cutting head through a substantially concentric path relative to the center axis.

2. The method of claim 1 further comprising adjusting the distance between an inner cutter of the cutting head and an outer cutter of the cutting head to select a desired pipe wall thickness.

3. The method of claim 1 wherein securing the first external self-centering clamp includes driving at least three engagement pads inwardly each of the at least three engagement pads being driven along a radial direction toward the center axis.

4. The method of claim 1 wherein driving an expansion device to expand together at least three pads includes driving an expansion sleeve against a backside of the at least three pads to thereby expand the at least three pads together radially outwardly.

5. The method of claim 1 wherein machining includes machining simultaneously both the inner wall surface and the outer wall surface at the end of the pipe.

* * * * *